D. J. BRIMMER.
Dumping Car.

No. 113,013.  Patented March 28, 1871.

Witnesses:
Fred. Artos
G. W. Bigsby

Inventor:
Daniel J. Brimmer

United States Patent Office.

DANIEL J. BRIMMER, OF NORTH PETERSBURG, ASSIGNOR TO MARTIN E. BRIMMER, OF RENSSELAER COUNTY, NEW YORK.

Letters Patent No. 113,013, dated March 28, 1871.

IMPROVEMENT IN DUMPING-CARS.

The Schedule referred to in these Letters Patent and making part of the same.

I, DANIEL J. BRIMMER, of the town of North Petersburg, county of Rensselaer, in the State of New York, have invented certain Improvements in Dumping-Cars and like conveyances, of which the following is a specification.

My invention relates to an arrangement of dumping-cars or boxes on one platform-car, and a holding and self-releasing device for the outside hinged doors of same.

In the drawing—

In the several figures—

A represents the car-platform, and

B, the several dumping-boxes secured to the same.

The ends $a$ of these are rigidly attached to their bottoms $b$. The inner sides may be also; or hinged, if desired. If hinged, due provision, such as a hook and eye, or any ordinary similar device, can be applied to keep secure in place during transit, during which time each dumping-box B, particularly if loaded, must be kept in a horizontal position, as shown in fig. 3, by means of a hook and eye, $d$, or by any similar device.

Figure 1:
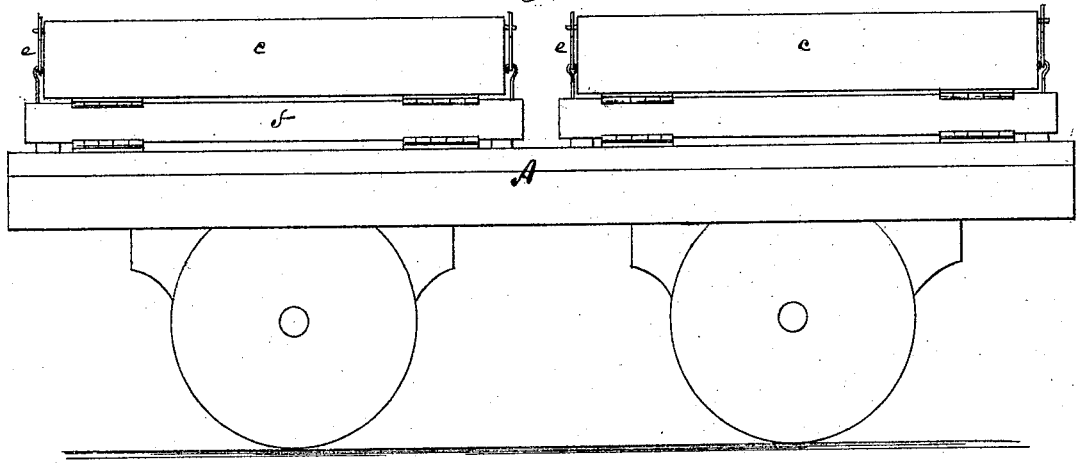
Figure 1 is a side elevation of my invention.
Figure 2:
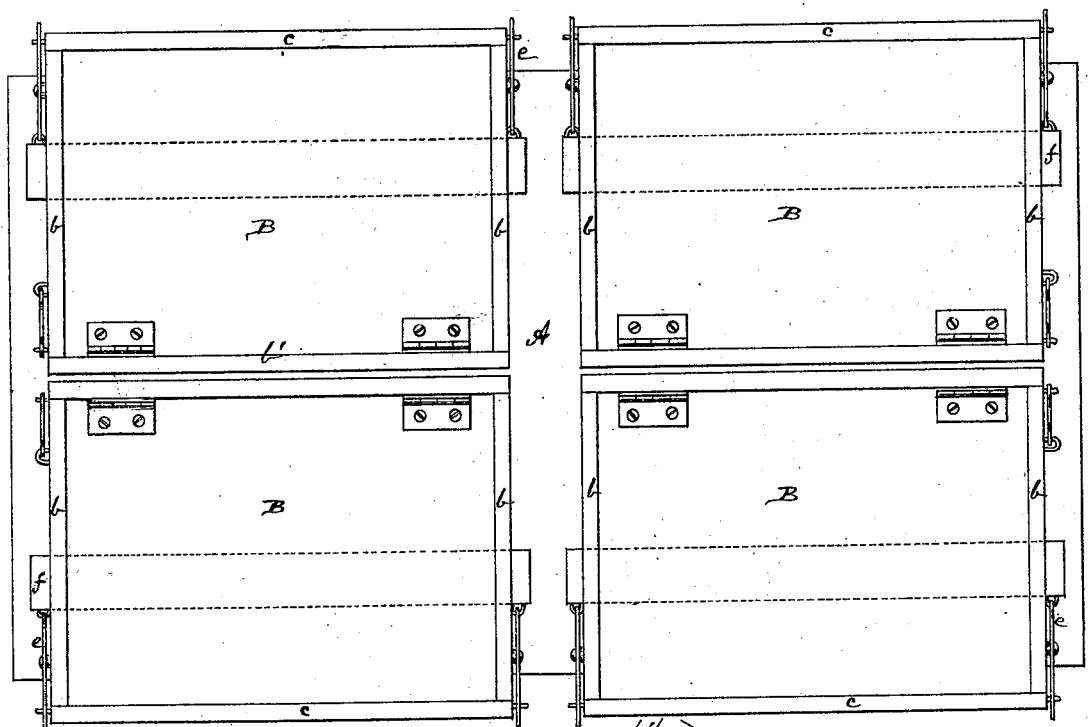
Figure 2 is a top view.
Figure 3:
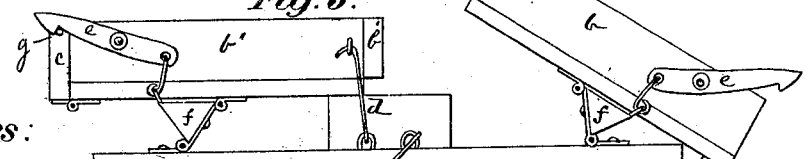
Figure 3 is an end elevation, showing one of the boxes tilted or "dumped."

Fig. 3 shows one of the boxes in an inclined or dumping position, its outer hinged side $c$ being down in the position of discharging the load.

These outer hinged sides are secured in an upright position by means of a pivoted hooked lever, $e$, the inner end of which is secured to the triangular tilting-bar $f$, to which the box is hinged, as seen in fig. 3.

It will also be seen by the same figure that this bar is also hinged to the platform A, and is shown in its upright or normal as well as in its tilted position.

The pivoted and hooked lever $f$ takes or hooks over a pin, $g$, in the end of the hinged sides $c$. The other end is connected by a link to the end of the triangular bar $f$, and when the box is tilted or dumped, as seen in fig. 3, the pivoted lever $f$ becomes automatically unhooked, and the hinged side takes the position seen in fig. 3, when the load is discharged.

Some of the boxes may be so arranged as to tilt at the ends instead of, or as well as, at the sides of the platform.

Having thus described my invention,

What I claim as new, and desire to secure by Letters Patent of the United States, is—

1. The arrangement and combination of two or more dumping-boxes B with the platform A and tilting-bars $f$.

2. In combination with a dumping-box, the triangular tilting-bar $f$ and the pivoted hooked lever $e$, arranged and operating as shown and described.

DANIEL J. BRIMMER.

Witnesses:
A. C. BURR,
G. E. POWELL.